(12) United States Patent (10) Patent No.: US 8,638,233 B2
Aguren et al. (45) Date of Patent: Jan. 28, 2014

(54) CABLE CONNECTION COMPONENT CONFIGURED TO PROVIDE VISIBLE INDICATIONS

(75) Inventors: Jerry G. Aguren, Tomball, TX (US); Richard E. Wagner, Painted Post, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 478 days.

(21) Appl. No.: 12/902,359

(22) Filed: Oct. 12, 2010

(65) Prior Publication Data

US 2011/0221609 A1 Sep. 15, 2011

Related U.S. Application Data

(60) Provisional application No. 61/250,913, filed on Oct. 13, 2009.

(51) Int. Cl.
*G08B 21/00* (2006.01)

(52) U.S. Cl.
USPC .................. 340/815.42; 340/815.45; 439/490

(58) Field of Classification Search
USPC ............ 340/815.42, 815.45, 686.1, 687, 540, 340/635; 439/488–491; 362/23.01, 23.07, 362/23.19
See application file for complete search history.

(56) References Cited

U.S. PATENT DOCUMENTS

| | | | |
|---|---|---|---|
| 5,790,041 A * | 8/1998 | Lee | ........................ 340/815.45 |
| 5,924,889 A | 7/1999 | Wang | |
| 7,670,170 B2 * | 3/2010 | Henry et al. | .................. 439/490 |
| 2006/0003621 A1 | 1/2006 | Kolvick et al. | |

\* cited by examiner

*Primary Examiner* — Jeffrey Hofsass

(57) ABSTRACT

A cable connection component is receivable in a housing of a host information handling device for coupling to a circuit of the host device. The component has a status light and a light guide configured, in use with the component at least partially received in the host housing, to guide light from the status light to provide indications visible externally of the host housing. A connection device, a cable end connector and an SFP-type or SFF-type transceiver body are also disclosed.

15 Claims, 6 Drawing Sheets

CABLE CONNECTION COMPONENT CONFIGURED TO PROVIDE VISIBLE INDICATIONS

CROSS-REFERENCE TO RELATED APPLICATIONS

This application claims the benefit of provisional application No. 61/250,913 filed 13 Oct. 2009.

BACKGROUND

It is known to provide status indicator lights relating to cable connections for electronic equipment, for example to indicate the link status of a computer network device port. Such lights can be provided for example on a front panel of the equipment or on a rear panel of the equipment in a vicinity of a relevant port. Some cable connection components are receivable within a housing of a host device for enabling communication between an external cable and a circuit of the host device. If it is desired for such a cable connection component to provide visible indications outside of the host housing, difficulties can arise. For example, in increasingly compact modern electronic systems, some cable connection components have little space available for conveniently mounting and connecting a suitable light emitter.

BRIEF DESCRIPTION OF THE DRAWINGS

In order that the invention may be well understood, various embodiments thereof will now be described, by way of example only, with reference to the accompanying drawings, in which.

DETAILED DESCRIPTION

Figure 5:
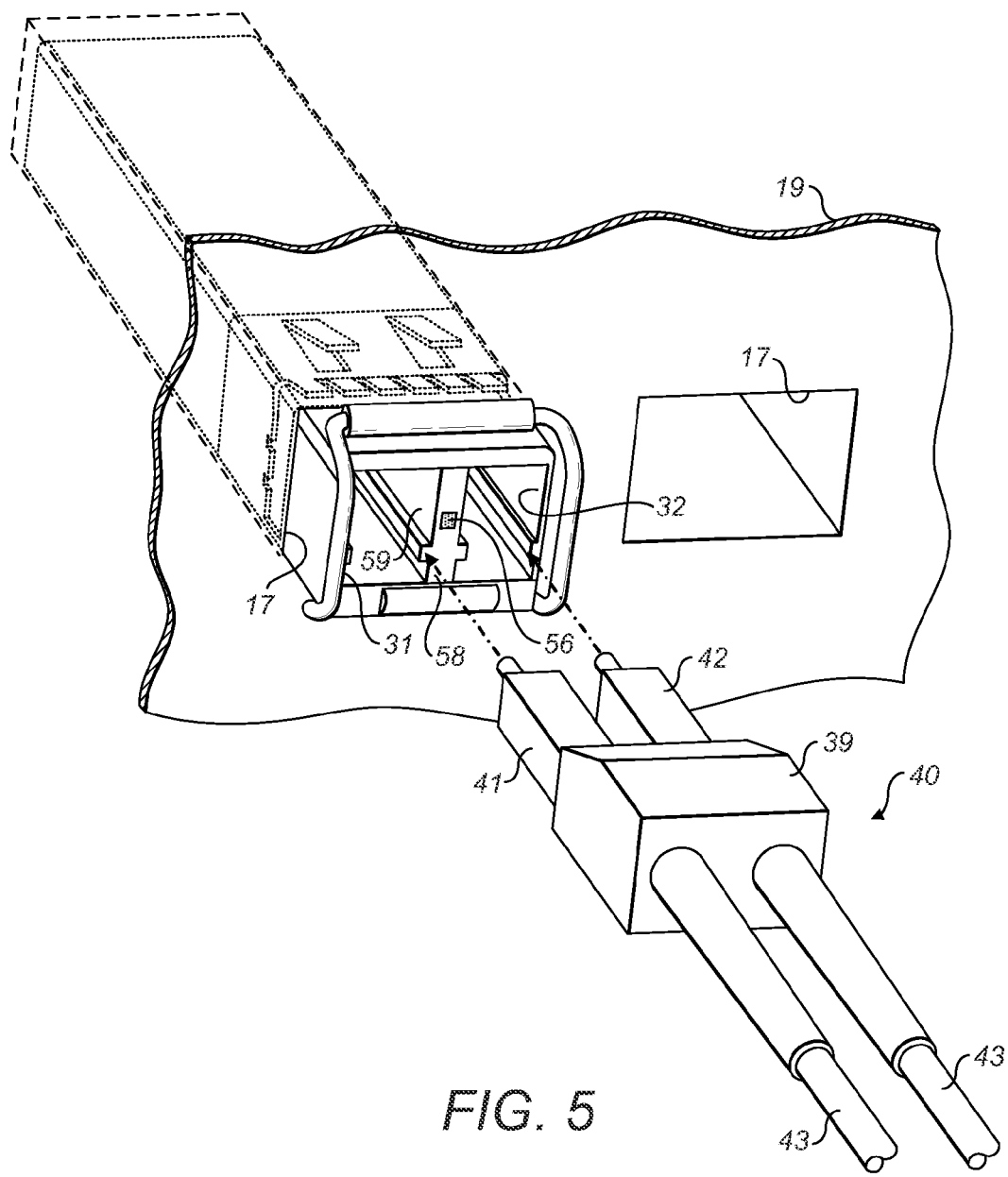
FIG. 5 shows the cable connection component received within the host housing.

Referring to FIGS. 1 to 5, a connection device in the form of a cable connection component 10 comprises a body 20 having rear portion 25 and a front end portion 30. The rear portion 25 is removably receivable within a housing 19 (partially shown in FIGS. 4 and 5) of a host information handling device, for example a switch or other network device. The cable connection component 10 includes a printed circuit board (PCB) 21 providing a control circuit for controlling the cable connection component 10. A rear end portion of the printed circuit board 21 carries electrical contacts 22 for connection to contacts 23 coupled to a circuit 18 of the host device. The rear portion 25 of the cable connection component 10 is removably pluggable, to couple to the cable connection component PCB 21 with the host device circuit 18, through an access opening 17 of the host housing 19 that enables access between the connection component 10 and external cabling. Conveniently, a cage 16 is provided within the host housing 19 in alignment with the access opening 17 and the contacts 23 of the circuit 18, for guiding and/or securing the rear body portion 25 relative to the host housing 19. With the rear portion 25 of the cable connection component body 20 received in the host housing 19, the front end portion 30 is located at or immediately adjacent the access opening 17 of the host housing 19, as shown in FIG. 5.

At the front end portion 30 thereof, the cable connection component body 20 defines two openings 31, 32 to respective recesses for receiving respective male connector portions 41, 42 extending from a main body portion 39 of a cable end connector 40 (FIG. 5) for external cabling 43, for example single mode or multi mode optical fibre cabling. The body 20 includes a divider in the form of a central dividing wall 59 that vertically divides the openings 31, 32 and recesses, the wall 59 having a front edge 58. The body 20 also accommodates a transmitter optical subassembly (TOSA) 51 and a receiver optical subassembly (ROSA) 52 which are electrically coupled for communication with the PCB 21. In use, with the cable end connector 40 inserted in the body 20, the male connector portions 41, 42 are respectively optically coupled to the TOSA 51 and ROSA 52. The TOSA 51 comprises, for example, an LED or laser source and signal conditioning electronics, and injects a signal into a fibre cable. The ROSA 52 includes, for example, a photodiode semiconductor, signal conditioning circuitry and an amplifier, and converts light received from an optical cable into electrical signals. At the front end portion 30, the cable end connector 10 can also include a securing mechanism activated by a hinged lever, or bail, 33 for securing a cable end connector 40 relative to the cable connection component 10.

Various aspects of the cable connection component 10 and other items described herein may be provided in accordance with one or more agreed standards. For example, the cable connection component 10 of the present embodiment can comprise an SFP-type optical transceiver having a mechanical interface according to the INF-8074i specification for (SFP) Small Formfactor Pluggable Transceiver published by the SFF Committee industry group. The term SFP-type as used herein relates to components that accord with any specification published by the SFF Committee that develops the SFP mechanical or electrical interface including, without limitation, specifications relating to SFP+ and QuadSFP. The invention is not limited to use with SFP-type optical transceivers. For example, the invention can be applied to other types of optical transceiver, SFPs for connecting to copper cables, SFF-type (non-pluggable) connection components (also specified by SFF Committee specifications), removably pluggable SFP-type cable end connectors such as active optical or active copper cable connectors, and to any other suitable cable connection component. The cable end connector 40 can be an LC connector, for example, as shown in FIG. 5, or any other type of connector suitable for connection to the cable connection component.

Figure 1:
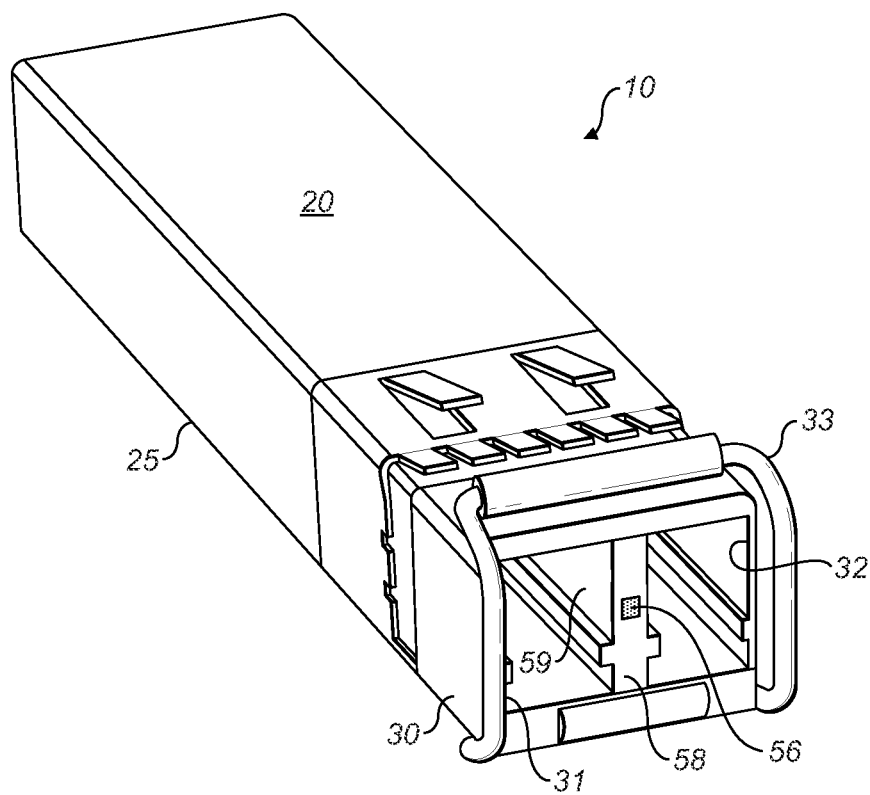
FIG. 1 is a perspective view of a cable connection component from the front, top and one side.
Figure 2:
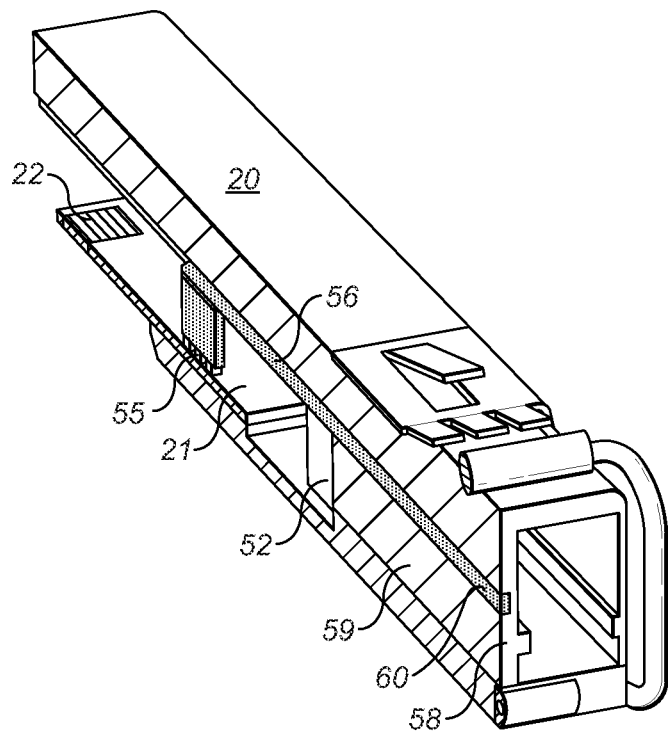
FIG. 2 is a perspective sectional view of portions of the component of FIG. 1.
Figure 3:
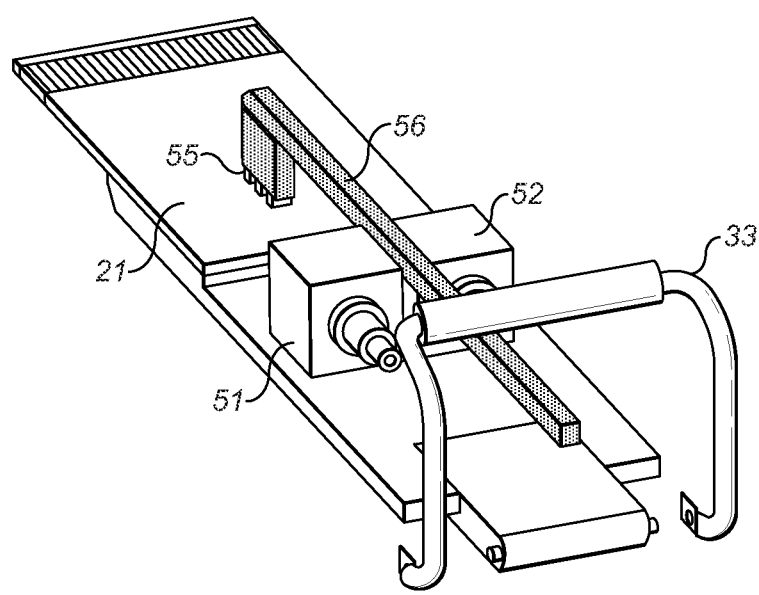
FIG. 3 is a perspective view of portions of the component of FIGS. 1 and 2, some portions having been removed for clarity.
Figure 4:
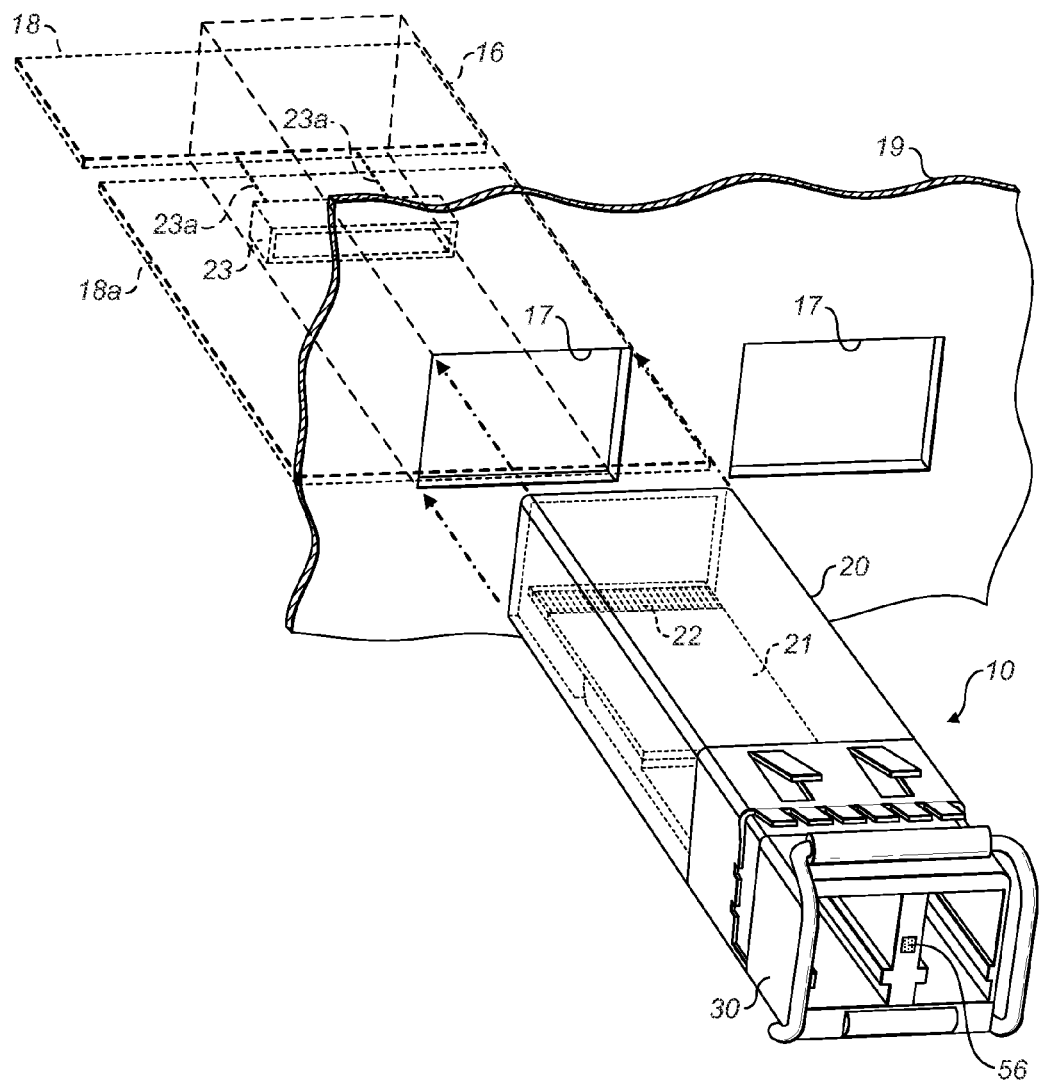
FIG. 4 illustrates how the cable connection component removably plugs through an opening in a housing of a host device into a cage within the host housing.

The inventor has developed a use for a visual indicator to provide signals at the front end of a cable connection component such as the SFP transceiver shown in FIGS. 1 to 5. Many modern cable connection components have very compact internal and external configurations. There is very little available space or opportunity at the front end portion 30 of an SFP-type connection component in which to mount a suitable light emitting device such as a light emitting diode (LED). As best seen in FIGS. 1 to 3, the PCB 21 is disposed to the rear of the TOSA 51 and ROSA 52 which in turn are rearwardly disposed of the front end portion 30. This creates a further difficulty in connecting a suitably positioned light emitting device to the PCB 21 for providing power and control to the light emitting device.

As best shown in FIGS. 2 and 3, the cable connection component 10 comprises a light emitting device in the form of at least one light emitting diode (LED) 55 connected to the PCB 21 at a location to the rear of the TOSA 51 and ROSA 52. The LED 55 can, for example, be directly connected to the PCB 21, which facilitates ease of manufacture and reliability of connection. The LED can be controlled by the PCB 21 to act as a status light for providing status signals. The LED 55 can be a multicolour device, for providing a wider range of possible signals. The cable connection component 10 further includes a light guide 56, for example a moulded plastic light tube, rectangular waveguide, or any other suitable configuration and/or material. For example, the light guide could alternatively comprise an optical fibre, for example having a core comprising poly methyl methacrylate (PMMA) and cladding comprising silicone resin, if desired supported by a plastic moulded support. The light guide 56 is configured to collect light from the LED 55 and guide the collected light to the front end portion 30 of the connection component 10. The central dividing wall 59 of the housing 20 is provided with a passage 60 to accommodate the light guide 56. The TOSA 51 and ROSA 52 in the embodiment of FIGS. 1 to 3 have reduced vertical dimensions in the region of the longitudinal axis of the connection component 10. The path of the light guide 56 passes centrally of the connection component 10 from the region of the PCB 21, laterally between and above portions of the TOSA 51 and ROSA 52 and through the passage 60 to emerge at the front edge 58 of the central wall 59.

The PCB 21 can control the LED 55 to provide visible indications at the front end portion 30 of the connection component 10. In use, with the connection component 10 received in the host housing 19, the light guide 56 is configured to guide light from the status light 55 within the housing 19 to the front end portion 30 of the connection component 10 to or through the access opening 17 of the host housing 19 to provide externally visible indications adjacent the host housing 19.

Figure 6:
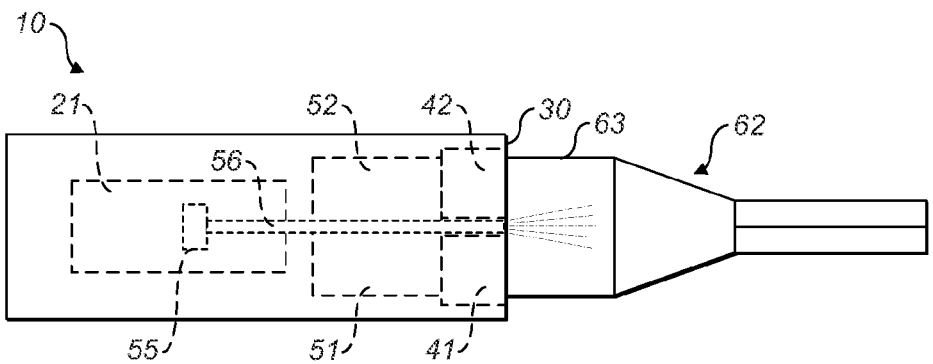
FIG. 6 is a schematic view of a cable end connector connected to the cable connection component.

Referring to FIG. 6, a cable end connector 62 is removably connected to a cable connection component 10 that provides visible indications at an end portion 30 thereof, for example such as the SFP-type transceiver 10 described above with reference to FIGS. 1 to 5. At least a portion of an outer body 63 of the connector 62 is made of a transparent or translucent material, and the connector 62 is configured such that, when connected to the cable connection component 10, light from the visible indication is transmitted through the transparent or translucent material with sufficient intensity to be visible externally of a host device housing. Conveniently, the entire connector outer body 63, or a major portion thereof, is manufactured from one or more transparent or translucent materials. In the embodiment of FIG. 6, at least a major portion of the body 63 is transparent or translucent about the entire periphery of the body 63, to facilitate unobscured visibility of the visible indications in multiple different orientations of the connection component 10 and connector 62, and from multiple different viewing positions. Alternatively, for example, transparent or translucent windows can be provided in the connector outer body 63 at one or more peripheral locations about the periphery of the body 63. In this manner, the cable and connector 62 is adapted to display the visible indications provided by the cable connection component 10. The connector 62 can be, for example, an LC connector, or any other suitable type of connector for connecting to the cable connection component. In one embodiment, the main body portion 39 of the LC connector 40 shown in FIG. 5 is made of transparent or translucent material.

Figure 7:
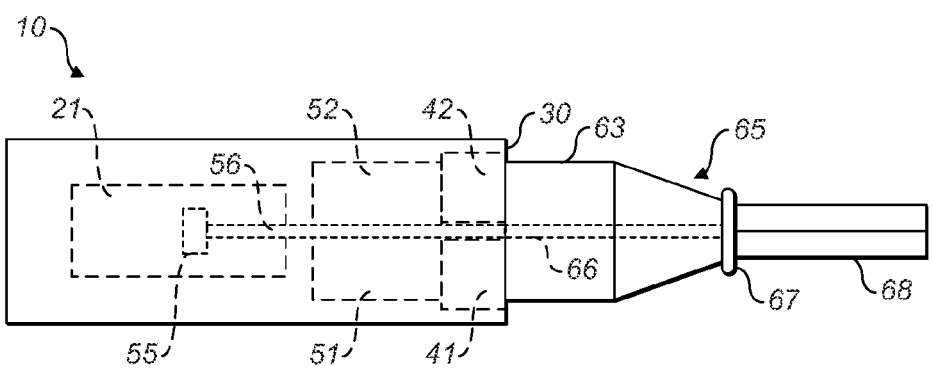
FIG. 7 is a schematic view of an alternative cable end connector connected to the cable connection component.

FIG. 7 shows an alternative cable end connector 65 adapted to display visible indications provided by a cable connection component. The cable end connector 65 comprises a light guide 66 to collect light emitted from a front end portion 30 of the cable connection component 10 and guide the collected light to a display region. In FIG. 7, the display region is provided by a peripheral transparent or translucent light guide in the form of a light pipe 67 extending about the periphery of a distal end portion of the end connector 65, adjacent to a region of entry of the cabling 68 to the connector. Alternatively, the peripheral light guide 67 could extend about the periphery of the cabling 68. In this manner, light signals from the cable end connector 65 are guided through the end connector 65 and made visible about the periphery of the end connector 65 or cabling 68. This facilitates visibility of the light signals in different orientations of the end connector 65 and from multiple different viewing positions, unobscured by, for example, the cabling 68 or the body of the end connector 65. The peripheral light guide 67 can in some embodiments extend only partially about the periphery of the end connector 65 or cabling 68, and/or be transparent or translucent only along a part or parts of its peripheral extent. In alternative embodiments, light can be displayed, for example, through transparent or translucent portions of the end connector 65 in the region of the distal end of the end connector 65, that is, in the region of the opposite end of the end connector 65 from the cable connection component 10.

Figure 8:
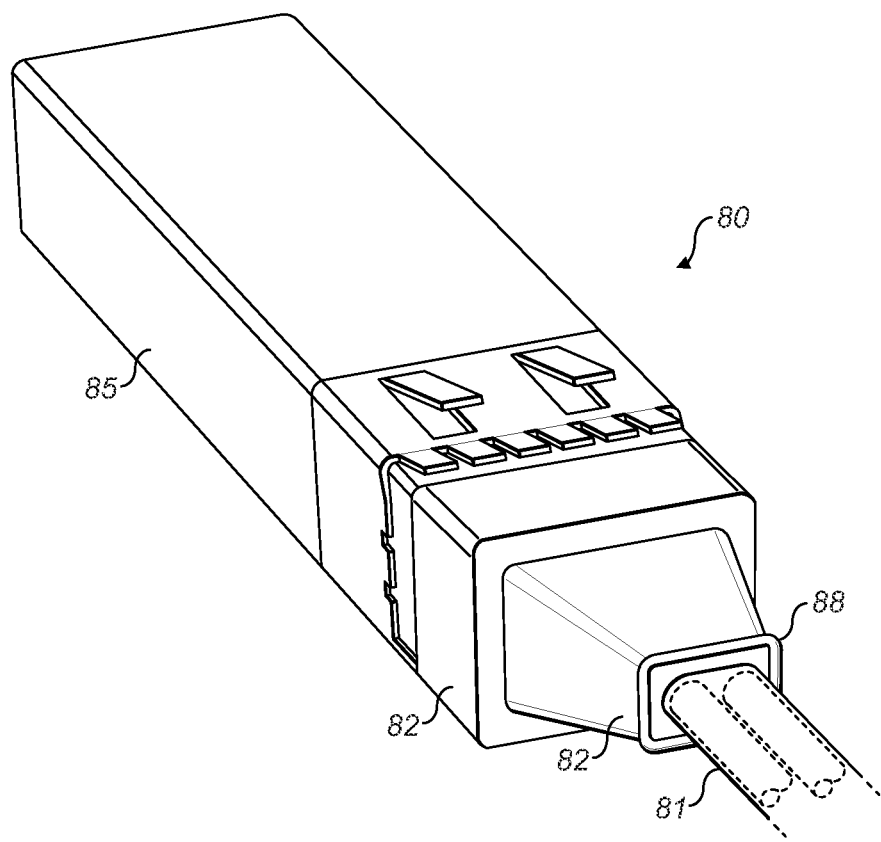
FIG. 8 shows a cable connection component integrally connected to cabling.

FIG. 8 shows an alternative cable connection component 80 comprising a rear portion 85, similar to rear portion 25 of FIG. 1, removably pluggable into a host device through an access opening 17. The connection component 80 is similar to the connection component 10 except that the connection component 80 is integrally connected to cabling 81 by an integral end portion 82 configured to extend, in use, externally of the host housing 19. Cables having this arrangement are sometimes referred to as active (for example active optical or active copper) cables. The integral end portion 82 is adapted to display visible indications externally of the host housing 19 using light from LED 55 that is guided along a light guide 86 to the integral portion 82. The visible indications can be displayed in any convenient manner. For example, light guide 86 can extend to a transparent or translucent body region similarly to the embodiment described with reference to FIG. 6. For example, the entire integral portion 82 outer body can be made from a transparent or translucent material. In alternative embodiments, the light guide 86 can extend to a distal region of the integral portion 82, and visible indications can be displayed using, for example, a peripherally extending light guide of the portion 82, such as an at least in parts transparent or translucent light pipe ring 88 as shown in FIG. 8, and/or or using transparent or translucent material elsewhere in the distal region, or in any other convenient manner.

While the present disclosure describes various embodiments, these embodiments are to be understood as illustrative and do not limit the claim scope. Many variations, modifications, additions and improvements of the described embodiments are possible. Variations and modifications of the embodiments disclosed herein may be made while remaining within the scope of the following claims.

What is claimed is:

1. A cable connection component receivable in a housing of a host information handling device for coupling to a circuit of the host device, the component comprising:
   a status light and a light guide configured, in use with the component at least partially received in the host housing, to guide light from the status light to provide visible indications externally of the host housing;
   a light pipe ring extending around a periphery at a distal region of the cable end connector to display the visible indications; and
   a cable end connector removably pluggable into the host device through an access opening and integrally connected with cabling, the connection component having a portion configured to extend, in use, externally of the host housing, the externally extending portion being adapted to display the visible indications externally about a periphery of the cable end connector.

2. The cable connection component of claim 1, comprising an end portion defining at least one opening for receiving an external cable end connector, the end portion being located, in use, at or adjacent the access opening of the host housing, the light guide configured to provide the visible indications at the end portion of the component.

3. The cable connection component of claim 1, comprising a transmitter subassembly and a receiver subassembly for connection to respective cable end connectors receivable through respective openings, and a cable connection component control circuit connected to the status light, the light guide passing along a path from the status light, past the transmitter and receiver subassemblies to provide the visible indications at a location between the openings.

4. The cable connection component of claim 1, comprising a transmitter subassembly and a receiver subassembly for connection to respective cable ends, and a cable connection component control circuit connected to the status light, the light guide passing along a path from the status light between the transmitter and receiver subassemblies.

5. The cable connection component of claim 1, comprising at least one selected from the group comprising: an SFP-type removably pluggable intermediate connector; an SFF-type intermediate connector; a cable end connector removably pluggably connectable to an SFP-type host board connection arrangement.

6. A connection device receivable in a housing of a host device, the connection device comprising:
   control circuitry connected to a light emitter;
   a connection arrangement for connecting the control circuitry to a circuit of the host device;
   an end of the connection device defining at least one opening to at least one recess; and
   a light guide configured to display, at the end of the connection device, signals from the light emitter;
   a cable end connector removably pluggable into the host device through an access opening, the cable end connector having a housing portion configured to extend, in use, externally of the host device, the externally extending housing portion of the cable end connector being at least partially translucent to display the signals from the light emitter externally of the host device; and
   a light pipe ring extending around a periphery at a distal region of the cable end connector to display the signals from the light emitter.

7. The connection device of claim 6, wherein the light guide emerges at the end of the connection device through a divider that divides respective recesses of the connection device, the recesses adapted to receive respective cable end connector portions.

8. The connection device of claim 5, comprising an SFP-type or SFF-type optical transceiver, wherein the light guide passes between a transmitter optical subassembly and a receiver optical subassembly of the transceiver.

9. An SFP-type or SFF-type transceiver body configured to accommodate a circuit hoard, a transmitter optical subassembly and a receiver optical subassembly, the transceiver body providing a passage for a light guide between a region of the circuit board and a frontal edge of a wall at a front end of the transceiver body;
   a cable end connector removably pluggable into an access opening in the frontal edge of the wall at the front end of the transceiver body, the cable end connector integrally connected with cabling, the cable end connector having a portion configured to extend, in use, externally of a host housing, the externally extending portion being adapted to display the visible indications externally about a periphery of the cable end connector; and
   a translucent portion of the externally extending portion, wherein the translucent portion forms a plurality of windows in the externally extending portion.

10. The SFP-type or SFF-type transceiver body of claim 8, wherein the passage extends along a path between locations for respectively receiving a TOSA and a ROSA and emerges at the end of the connection device through a divider that divides respective recesses of the body adapted to receive respective cable end connector portions.

11. The cable connection component of claim 1, comprising a transparent connector body of the cable end connector to display the visible indications.

12. The cable connection component of claim 1, comprising a light guide extending around a periphery of the cable end connector to display the visible indications.

13. The cable connection component of claim 1, comprising a translucent portion of the externally extending portion.

14. The cable connection component of claim 13, wherein the translucent portion forms a plurality of windows in the externally extending portion.

15. The cable connection component of claim 14, wherein the plurality of windows are provided at peripheral locations around a periphery of the externally extending portion.

* * * * *

UNITED STATES PATENT AND TRADEMARK OFFICE
CERTIFICATE OF CORRECTION

PATENT NO.         : 8,638,233 B2
APPLICATION NO.    : 12/902359
DATED              : January 28, 2014
INVENTOR(S)        : Jerry G. Aguren et al.

Page 1 of 1

It is certified that error appears in the above-identified patent and that said Letters Patent is hereby corrected as shown below:

In the Claims

In column 6, line 14, in Claim 8, delete "claim 5," and insert -- claim 6, --, therefor.

In column 6, line 19, in Claim 9, delete "hoard," and insert -- board, --, therefor.

In column 6, line 35, in Claim 10, delete "claim 8," and insert -- claim 9, --, therefor.

Signed and Sealed this
Thirteenth Day of May, 2014

Michelle K. Lee
*Deputy Director of the United States Patent and Trademark Office*